US010021521B1

(12) United States Patent
Reeves et al.

(10) Patent No.: US 10,021,521 B1
(45) Date of Patent: Jul. 10, 2018

(54) DYNAMICALLY UPDATING THE LOCATION OF MOBILE WIRELESS REPEATERS

(71) Applicant: Sprint Communications Company L.P., Overland Park, KS (US)

(72) Inventors: Raymond Emilio Reeves, Oviedo, FL (US); Michael P. McMullen, Leawood, KS (US); Roger Danforth Bartlett, Merriam, KS (US); Mark Douglas Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 15/219,489

(22) Filed: Jul. 26, 2016

(51) Int. Cl.
*H04W 4/02* (2018.01)
*H04W 88/04* (2009.01)
*H04W 36/00* (2009.01)
*H04W 84/00* (2009.01)
*H04W 16/06* (2009.01)
*H04W 8/00* (2009.01)
*H04L 12/24* (2006.01)
(Continued)

(52) U.S. Cl.
CPC ............ *H04W 4/023* (2013.01); *H04B 7/155* (2013.01); *H04L 41/12* (2013.01); *H04W 8/005* (2013.01); *H04W 16/06* (2013.01); *H04W 16/24* (2013.01); *H04W 36/0055* (2013.01); *H04W 36/0072* (2013.01); *H04W 36/0077* (2013.01); *H04W 36/08* (2013.01); *H04W 84/005* (2013.01); *H04W 84/047* (2013.01); *H04W 88/04* (2013.01)

(58) Field of Classification Search
CPC ............ H04W 36/08; H04W 36/0055; H04W 36/0066; H04W 36/0072; H04W 36/0077; H04W 76/046; H04W 88/04; H04W 16/06; H04W 16/26; H04W 16/24; H04W 84/005; H04W 84/047; H04B 7/155; H04B 7/15507
See application file for complete search history.

(56) References Cited

U.S. PATENT DOCUMENTS 4,884,208 A 11/1989 Marinelli et al.
6,301,514 B1 10/2001 Canada et al.
(Continued)

*Primary Examiner* — Redentor Pasia
*Assistant Examiner* — Peter K Mak

(57) ABSTRACT

A Long-Term Evolution (LTE) communication system to facilitate updating network topology information when a mobile wireless repeater changes its attachment comprises a network topology server, a former macro LTE base station to which the mobile wireless repeater was previously attached, and a new macro LTE base station to which the mobile wireless repeater is presently attached. The network topology is server configured to receive updated attachment information transmitted from the mobile wireless repeater and transfer an attachment scan instruction for delivery to the former macro LTE base station and the new macro LTE base station. The former and new macro LTE base stations are configured to determine network attachment information for one or more network wireless repeaters and transfer the network attachment information for delivery to the network topology server. The network topology server is further configured to receive the network attachment information and update a network topology map.

20 Claims, 6 Drawing Sheets

(51) Int. Cl.
 *H04B 7/155* (2006.01)
 *H04W 84/04* (2009.01)
 *H04W 16/24* (2009.01)
 *H04W 36/08* (2009.01)

(56) References Cited

U.S. PATENT DOCUMENTS

| | | |
|---|---|---|
| 6,728,514 B2 | 4/2004 | Bandeira et al. |
| 6,961,367 B2 | 11/2005 | Simic et al. |
| 7,016,688 B2 | 3/2006 | Simic et al. |
| 7,457,584 B2 | 11/2008 | Baker et al. |
| 7,546,084 B2 | 6/2009 | Kennedy, Jr. et al. |
| 7,822,427 B1 | 10/2010 | Hou |
| 8,699,943 B2 | 4/2014 | Kummetz et al. |
| 2002/0072329 A1 | 6/2002 | Bandeira et al. |
| 2004/0147221 A1 | 7/2004 | Sheynblat et al. |
| 2008/0025208 A1 | 1/2008 | Chan |
| 2010/0265848 A1 | 10/2010 | Kummetz et al. |
| 2012/0315913 A1* | 12/2012 | Yang ............. H04W 48/16 455/438 |
| 2013/0137431 A1* | 5/2013 | Aminaka ............. H04B 7/155 455/435.1 |
| 2015/0148062 A1* | 5/2015 | Chen ............. H04W 60/00 455/456.1 |
| 2016/0373980 A1* | 12/2016 | Yu ............. H04W 36/0077 |

\* cited by examiner

DYNAMICALLY UPDATING THE LOCATION OF MOBILE WIRELESS REPEATERS

TECHNICAL BACKGROUND

Wireless communication systems typically include wireless access nodes which provide access to communication services for wireless communication devices over wireless links. A typical wireless communication system includes systems to provide wireless access across a geographic region, with different wireless coverage areas associated with individual wireless access nodes. The wireless access systems exchange communications between wireless communication devices, service providers, and other network elements. The communications typically include voice calls, data exchanges, web pages, streaming media, text messages, and other communication services. In Long-Term Evolution (LTE) communication systems, a wireless communication device is referred to as User Equipment (UE), while a wireless access node is called an enhanced Node B (eNodeB).

In some geographic areas, such as rural or remote locations, it is impractical or not cost effective to install eNodeB base stations to provide coverage to a small number of users. In such situations, wireless repeaters may be employed to relay communications between the UE devices and a serving eNodeB, thereby expanding the coverage footprint of the network. The network may also deploy mobile wireless repeaters on-demand, which may frequently change their points of attachment. However, due to the unobtrusive design goal of wireless repeaters, which are intended to operate transparently to the UE and backend location systems, the UE and other network systems currently have no way to tell the difference between whether the UE is attached directly to an eNodeB tower or to a remotely located wireless repeater. Thus, when the location of a UE device is needed, such as for location-based commercial services or emergency services, the use of wireless repeaters distort the returned location if the eNodeB tower that is ultimately serving the UE is used to estimate the location of the UE, particularly when the eNodeB is located a great distance from the UE device and the repeater to which the UE is attached.

Overview

A method of operating a Long-Term Evolution (LTE) communication system to facilitate updating network topology information when a mobile wireless repeater changes its attachment is disclosed. The method comprises, in a network topology server, receiving updated attachment information transmitted from the mobile wireless repeater. The method further comprises, in the network topology server, processing the updated attachment information to identify a former macro LTE base station to which the mobile wireless repeater was previously attached and a new macro LTE base station to which the mobile wireless repeater is presently attached. The method further comprises, in the network topology server, transferring an attachment scan instruction for delivery to the former macro LTE base station and the new macro LTE base station. The method further comprises, in the former macro LTE base station, in response to the attachment scan instruction, determining former network attachment information for one or more former network wireless repeaters attached to the former macro LTE base station and transferring the former network attachment information for delivery to the network topology server. The method further comprises, in the new macro LTE base station, in response to the attachment scan instruction, determining new network attachment information for one or more new network wireless repeaters attached to the new macro LTE base station and transferring the new network attachment information for delivery to the network topology server. The method further comprises, in the network topology server, receiving the former network attachment information and the new network attachment information and updating a network topology map with the former network attachment information and the new network attachment information.

A Long-Term Evolution (LTE) communication system to facilitate updating network topology information when a mobile wireless repeater changes its attachment comprises a network topology server, a former macro LTE base station to which the mobile wireless repeater was previously attached, and a new macro LTE base station to which the mobile wireless repeater is presently attached. The network topology is server configured to receive updated attachment information transmitted from the mobile wireless repeater, process the updated attachment information to identify the former macro LTE base station to which the mobile wireless repeater was previously attached and the new macro LTE base station to which the mobile wireless repeater is presently attached, and transfer an attachment scan instruction for delivery to the former macro LTE base station and the new macro LTE base station. The former macro LTE base station is configured to, in response to the attachment scan instruction, determine former network attachment information for one or more former network wireless repeaters attached to the former macro LTE base station and transfer the former network attachment information for delivery to the network topology server. The new macro LTE base station is configured to, in response to the attachment scan instruction, determine new network attachment information for one or more new network wireless repeaters attached to the new macro LTE base station and transfer the new network attachment information for delivery to the network topology server. The network topology server is further configured to receive the former network attachment information and the new network attachment information and update a network topology map with the former network attachment information and the new network attachment information.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
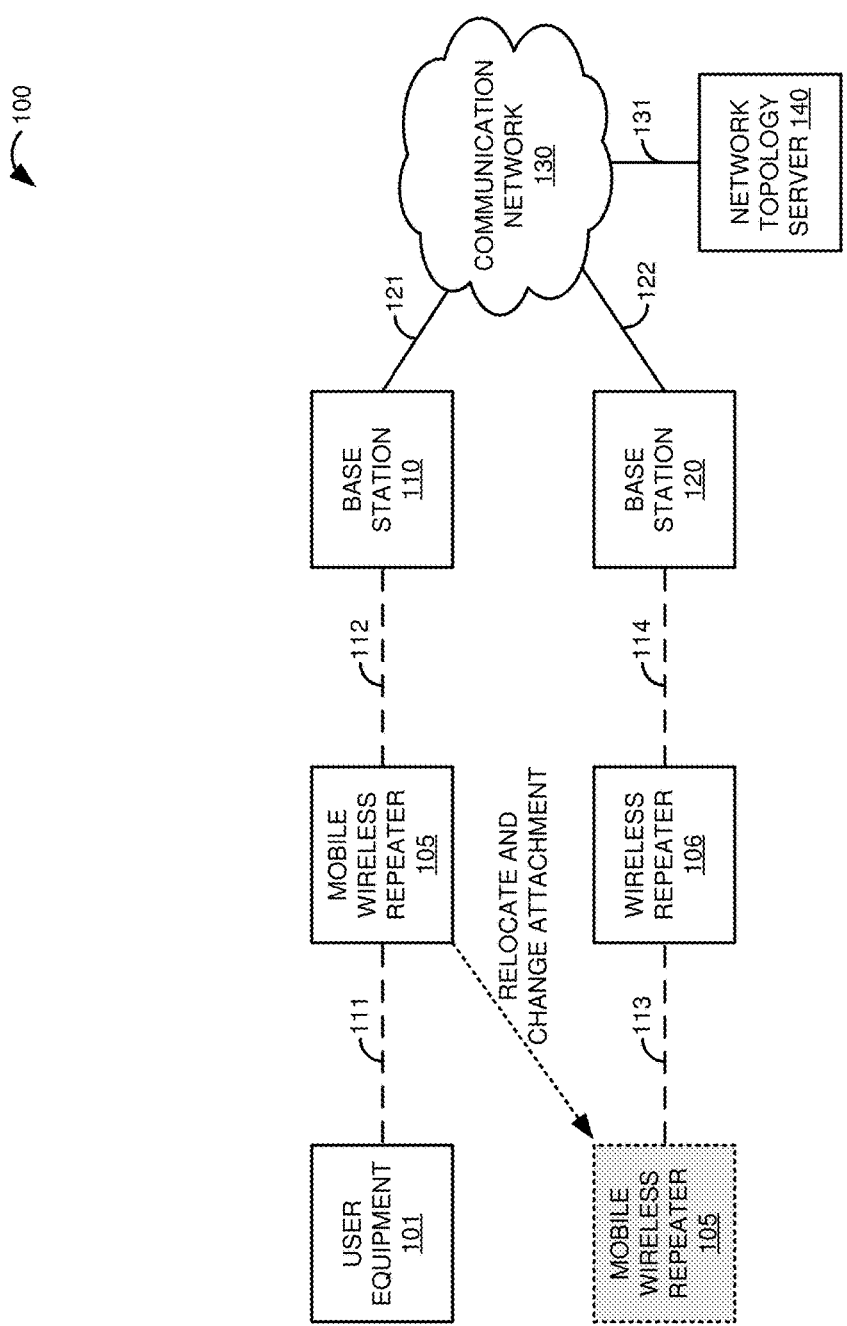
FIG. 1 is a block diagram that illustrates a communication system.

FIG. 1 is a block diagram that illustrates communication system 100. Communication system 100 includes User Equipment (UE) 101, mobile wireless repeater 105, wireless repeater 106, base stations 110 and 120, communication network 130, and network topology server 140. UE 101 and mobile wireless repeater 105 are in communication over wireless communication link 111. Mobile wireless repeater 105 and base station 110 initially communicate over wireless communication link 112. However, as shown by the dotted line and gray shading of mobile wireless repeater 105, in this example mobile wireless repeater 105 is relocated and changes its attachment from base station 110 to wireless repeater 106, and communicates with wireless repeater 106 over wireless communication link 113. Wireless repeater 106 is in communication with base station 120 over wireless communication link 114. Base station 110 and communication network 130 are in communication over communication link 121, while base station 120 and communication network 130 communicate over communication link 122. Network topology server 140 and communication network 130 communicate over communication link 131.

Figure 2:
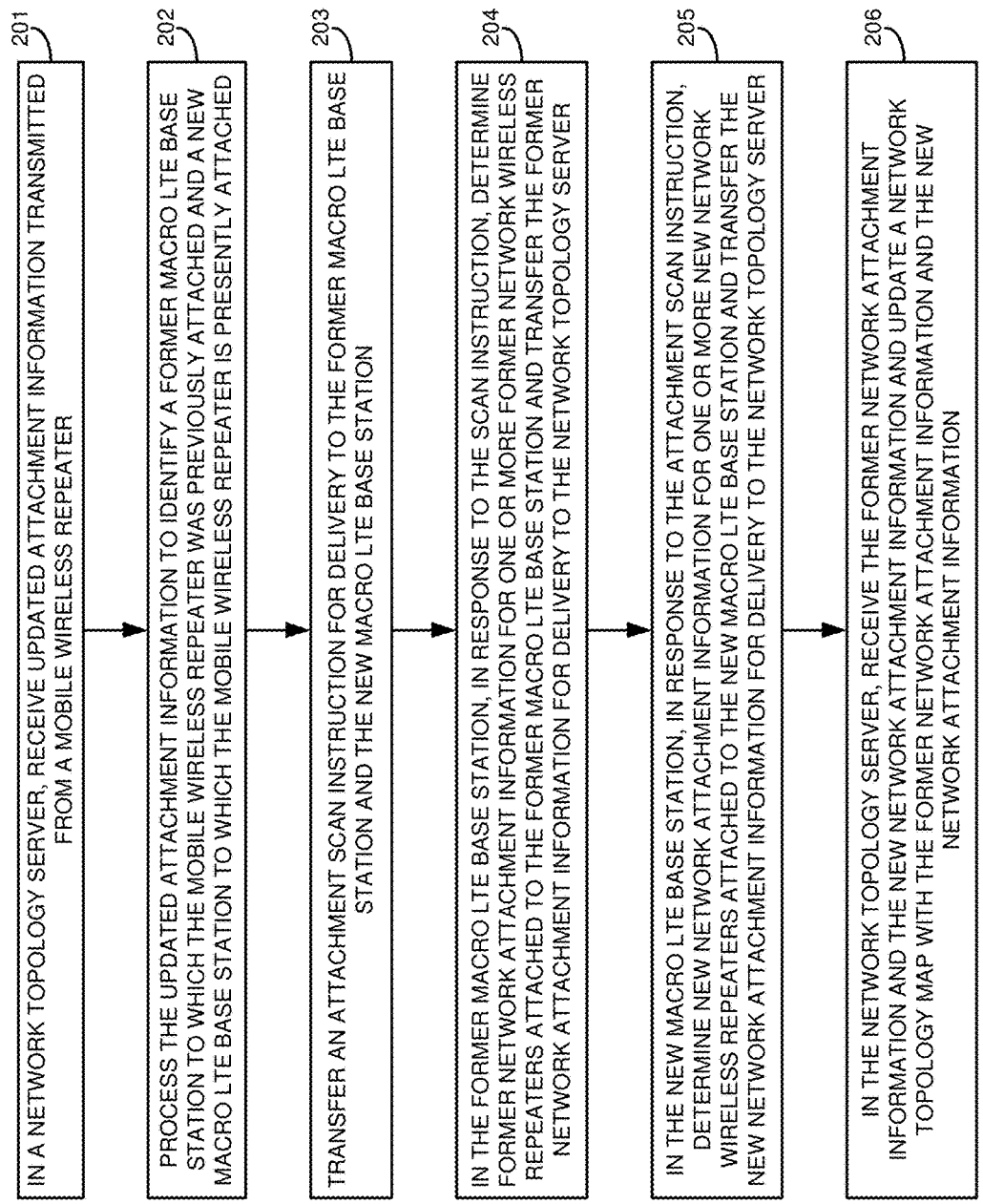
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by network topology server 140 and base stations 110 and 120 to facilitate updating network topology information when mobile wireless repeater 105 changes its attachment. In order to illustrate its operations, the following discussion of the process shown in FIG. 2 will proceed with reference to base station 110 initially serving UE device 101 via mobile wireless repeater 105 as shown in FIG. 1, but note that the details provided in FIG. 1 are merely exemplary and not intended to limit the scope of the process to the specific implementation shown in FIG. 1.

In the operational flow of FIG. 2, network topology server 140 receives updated attachment information transmitted from mobile wireless repeater 105 (201). As shown in FIG. 1, mobile wireless repeater 105 is initially attached to base station 110 and is serving UE 101 by relaying communications between base station 110 and UE 101. However, as shown by the dotted lines and gray shading, mobile wireless repeater 105 relocates its position and changes its attachment to wireless repeater 106, which in turn communicates with base station 120. UE 101 may then communicate with mobile wireless repeater 105 to exchange communications with base station 120 via wireless repeater 106 (not shown for clarity). Upon changing its attachment, mobile wireless repeater 105 transmits updated attachment information for delivery to network topology server 140. In some examples, the updated attachment information transmitted from mobile wireless repeater 140 and received by network topology server 140 comprises former repeater attachment information and new repeater attachment information. For example, the former repeater attachment information could comprise a former donor node and one or more former serving nodes, and the new repeater attachment information could comprise a new donor node and one or more new serving nodes. From the perspective of wireless repeater 105, serving nodes may be defined as any network node, such as a wireless repeater, base station, and the like, that is served by mobile wireless repeater 105, and donor nodes may be defined as any network node that serves mobile wireless repeater 105. Thus, in this example, mobile wireless repeater 105 would report the former repeater attachment information as a former donor node of base station 110 and having no former serving nodes, and the new repeater attachment information as a new donor node of wireless repeater 106 and having no new serving nodes. Mobile wireless repeater 105 could report its former and new attachments to network topology server 140 in other formats and using alternative techniques. In some examples, in addition to the updated attachment information, mobile wireless repeater 105 could report additional information, such as an identifier of mobile wireless repeater 105, latitude and longitude location coordinates of mobile wireless repeater 105, a velocity vector that indicates the speed and direction that mobile wireless repeater 105 is traveling, a number of UE devices formerly or presently attached to mobile wireless repeater 105, power status, weather information, signal strength, and any other data detected by mobile wireless repeater 105. Accordingly, network topology server 140 may receive an identifier, location, and velocity vector of mobile wireless repeater 105 and any other desired information along with the updated attachment information transmitted from mobile wireless repeater 105.

Network topology server 140 processes the updated attachment information to identify a former macro LTE base station 110 to which mobile wireless repeater 105 was previously attached and a new macro LTE base station 120 to which mobile wireless repeater 105 is presently attached (202). Typically, network topology server 140 processes the updated attachment information with a network topology map to identify the former macro LTE base station 110 and the new macro LTE base station 120. For example, network topology server 140 may have previously determined that wireless repeater 106 is attached to base station 120, so that when mobile wireless repeater 105 reports its new donor node as wireless repeater 106, network topology map can use this information to identify base station 120 as the new macro LTE base station 120 to which mobile wireless repeater 105 is presently attached via wireless repeater 106. In this example, mobile wireless repeater 105 would report its former donor node attachment as base station 110, so no additional processing by network topology server 140 would be required to identify the former macro LTE base station 110, but in other examples if mobile wireless repeater instead reported a wireless repeater as a former donor node, network topology server 140 could identify the former macro LTE base station 110 in the same manner as described above for the new macro LTE base station 120. Other techniques for network topology server 140 to identify former and new macro LTE base stations are possible and within the scope of this disclosure.

Network topology server 140 transfers an attachment scan instruction for delivery to former macro LTE base station 110 and new macro LTE base station 120 (203). Network topology server 140 typically transfers the attachment scan instruction responsive to receiving the updated attachment information from mobile wireless repeater 105, which indicates to network topology server 140 that mobile wireless repeater 105 has moved and changed its attachment, resulting in a different network topology than previously discovered by network topology server 140. The macro scan instruction triggers the macro base stations 110 and 120 to determine their attached nodes to identify their complete node trees, which may then be used by network topology server 140 to update its network topology map.

In response to the attachment scan instruction, former macro LTE base station 110 determines former network attachment information for one or more former network wireless repeaters attached to former macro LTE base station 110 and transfers the former network attachment information for delivery to network topology server 140 (204). Likewise, new macro LTE base station 120 determines new network attachment information for one or more new network wireless repeaters attached to new macro LTE base station 120 and transfers the new network attachment information for delivery to network topology server 140 (205). Former macro LTE base station 110 and new macro LTE base station 120 can determine their attached wireless repeaters in many ways. In some examples, LTE base stations 110 and 120 could determine the network attachment information by querying each of the wireless repeaters attached to their respective macro LTE base stations 110 and 120 for their attachment information. For example, macro LTE base station 120 could send a query to wireless repeater 106 for its attachment information, which could respond with a new serving node of mobile wireless repeater 105.

In some examples, LTE base stations 110 and 120 could determine the network attachment information by pinging each of the wireless repeaters attached to their respective macro LTE base stations 110 and 120 to determine delay time information, and then process the delay time information to determine a sequencing order of the attached wireless repeaters. For example, base station 120 could determine the round-trip delay (RTD) or round-trip time (RTT) by measuring the length of time it takes for a signal to be sent to a node plus the length of time it takes for an acknowledgment of that signal to be received back at base station 120, such as by pinging wireless repeaters 105 and 106 or transferring some other type of test signal. In some examples, wireless repeaters 105 and 106 may be configured to apply timestamps to packets during a communication session, or may apply timestamps in response to the attachment scan instruction, and base station 120 could process the timestamps to determine the amount of delay time associated with the wireless repeaters 105 and 106. The amount of delay time could then be used by network topology server 140 to determine the sequencing order of the attached repeaters, with shorter amounts of delay time indicating closer locations relative to the base station donor site. Other techniques for base stations 110 and 120 to determine their attached wireless repeaters for returning their network attachment information to network topology server 140 are possible and within the scope of this disclosure.

Network topology server 140 receives the former network attachment information and the new network attachment information and updates a network topology map with the former network attachment information and the new network attachment information (206). The former network attachment information enables network topology server 140 to update attachments in the network topology map where mobile wireless repeater 105 was formerly attached, and the new network attachment information provides data to update the attachments where mobile wireless repeater 105 is presently attached. Accordingly, network topology server 140 is able to keep track of the network topology as mobile wireless repeater 105 moves around and changes its attachment in the network. This information in the network topology map can then be used to provide improved location determinations for UE 101 when requested by emergency service providers and other location-based services. For example, network topology server 140 may receive a request for a location of UE device 101 served by mobile wireless repeater 105 and return the location of mobile wireless repeater 105 in response to the request. Other uses of the network topology map are possible and within the scope of this disclosure.

Advantageously, when mobile wireless repeater 105 is relocated and changes its attachment, repeater 105 reports its updated attachment information. Receipt of the updated attachment information signals to network topology server 140 that the network topology has changed, causing server 140 to transfer an attachment scan instruction to the base stations 110 and 120 formerly and currently serving mobile wireless repeater 105. Base stations 110 and 120 responsively determine and transfer their network attachment information back to the network topology server, which employs this information to update its network topology map. In this manner, a complete network topology is discovered and known whenever a mobile wireless repeater 105 moves and changes its attachment in the network. If UE 101 is then served by mobile wireless repeater 105 via base station 120, the location of mobile wireless repeater 105 can be used for the location of UE 101 instead of base station 120, thereby providing a more accurate location determination for UE 101. Accordingly, the appropriate public-safety answering point (PSAP) will be contacted in the case of an emergency, and commercial location-based services will also benefit from the improved location accuracy, providing a technical advantage over alternative solutions.

Now referring back to FIG. 1, UE 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. UE 101 could comprise a dual-mode device capable of communicating over multiple wireless protocols, including LTE wireless networks and non-LTE wireless networks. Wireless network protocols that may be utilized by UE 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE device 101 and a communication network.

Wireless repeaters 105 and 106 each individually comprise RF communication circuitry and an antenna. The RF communication circuitry typically includes amplifiers, filters, RF modulators, transceivers, and signal processing circuitry. Wireless repeaters 105 and 106 may also comprise a router, server, memory device, software, processing circuitry, cabling, power supply, network communication interface, structural support, or some other communication apparatus. Wireless repeaters 105 and 106 may further comprise a processing system, such as a microprocessor, computer-readable storage device, and executable processing instructions, which may be used to provide access to communication services to various devices. For example, wireless repeaters 105 and 106 can receive access to communication services over a communication link provided by a base station and provide this access to UE devices over associated wireless links. Wireless repeaters 105 and 106 could individually comprise a pico base station, wireless access node, Internet access node, telephony service node, wireless data access point, wireless relay node, or some other wireless communication system—including combinations thereof. Some examples of wireless repeaters 105 and 106 include a UE relay node, relay backhaul UE, customer premises equipment (CPE), picocell, femtocell, pico enhanced Node B (eNodeB), wireless access point, relay node, relay backhaul node, and others, including combinations thereof. Wireless network protocols that may be utilized by wireless repeaters 105 and 106 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Base stations 110 and 120 each individually comprise RF communication circuitry and an antenna. The RF communication circuitry typically includes amplifiers, filters, RF modulators, transceivers, and signal processing circuitry. Base stations 110 and 120 may also comprise a router, server, memory device, software, processing circuitry, cabling, power supply, network communication interface, structural support, or some other communication apparatus. Base stations 110 and 120 may further comprise a processing system, such as a microprocessor, computer-readable storage device, and executable processing instructions, which may be used to provide access to communication services to various devices. Base stations 110 and 120 could individually comprise a macro base station, pico base station, wireless access node, Internet access node, telephony service node, wireless data access point, or some other wireless communication system—including combinations thereof. Some examples of base stations 110 and 120 include a base transceiver station (BTS), base station controller (BSC), radio base station (RBS), Node B, enhanced Node B (eNodeB), macro eNodeB, pico eNodeB, backhaul node, picocell, femtocell, and others, including combinations thereof. Wireless network protocols that may be utilized by base stations 110 and 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 can also comprise elements such as Mobility Management Entity (MME) equipment, Home Subscriber Servers (HSS), Policy and Charging Rules Function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Network topology server 140 comprises a processing system and communication transceiver. Network topology server 140 may also include other components such as a router, server, data storage system, and power supply. Network topology server 140 may reside in a single device or may be distributed across multiple devices. Network topology server 140 may be a discrete system or may be integrated within other systems—including other systems within communication system 100. In some examples, network topology server 140 could comprise a computing system, location determination system, location repeater server, LTE network element, mobility management entity (MME), policy and charging rules function (PCRF), home subscriber server (HSS), session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Wireless communication links 111-114 use the air or space as the transport medium. Wireless communication links 111-114 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-114 may each comprise many different signals sharing the same link. For example, each wireless communication link 111-114 could individually include multiple signals operating in a single propagation path comprising multiple communication sessions, frequencies, timeslots, transportation ports, logical transportation links, network sockets, IP sockets, packets, or communication directions, including combinations thereof.

Communication links 121, 122, and 131 use metal, air, space, optical fiber such as glass or plastic, or some other material as the transport medium—including combinations thereof. Communication links 121, 122, and 131 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication links 121, 122, and 131 may be direct links or could include intermediate networks, systems, or devices.

Figure 3:
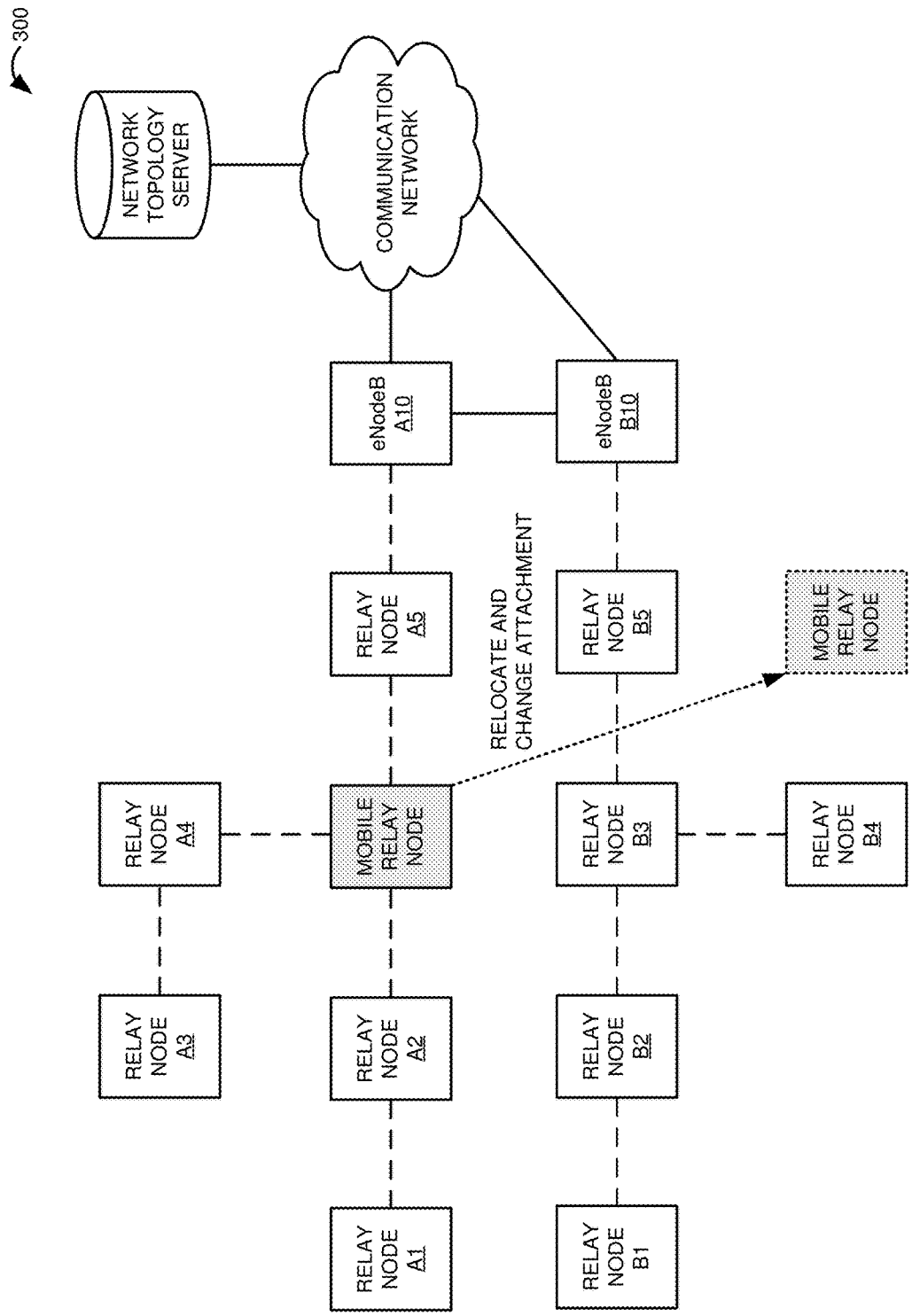
FIG. 3 is a block diagram that illustrates an LTE communication system in an exemplary embodiment.

FIG. 3 is a block diagram that illustrates LTE communication system 300 in an exemplary embodiment. LTE communication system 300 is an example of communication system 100, although communication system 100 may have alternative configurations and operations. LTE communication system 300 includes a network topology server, a mobile relay node, and wireless relay nodes A1-A5 served by an eNodeB base station A10 that is in communication with network elements of the LTE communication network. Likewise wireless relay nodes B1-B5 are served by eNodeB base station B10 that is also in communication with the LTE communication network. In FIG. 3, relay node A1 is served by relay node A2, which is in turn served by the mobile relay node. The mobile relay node is also serving relay node A4 which in turn serves relay node A3. The mobile relay node is served by relay node A5 which is attached to eNodeB A10. Relay node B1 is served by relay node B2, which is in turn served by relay node B3. Relay node B3 is also serving relay node B4. Relay node B5 is serving relay node B3 and is attached to eNodeB B10. Note that although the mobile relay node is the only relay node designated as mobile, any of the relay nodes A1-A5 and B1-B5 could also be mobile in some examples.

In this example, relay nodes A1-A5 and B1-B5 are static repeaters that are run along a rural highway to provide coverage to UE devices that are operated in remote areas far away from the serving eNodeB base stations A10 and B10. The mobile relay node is a nomadic repeater that may be deployed on demand as needed, particularly when special events occur such as natural disasters or large gatherings at unconventional venues, for example. In FIG. 3, the mobile relay node is initially deployed among relay nodes A1-A5 served by eNodeB A10. The mobile relay node then moves away from relay nodes A1-A5 and relocates closer to relay nodes B1-B5 and eNodeB B10, as indicated by the dotted arrow and the dotted line around the relocated mobile relay node. The effect of the mobile relay node relocating will now be discussed with respect to FIG. 4.

Figure 4:
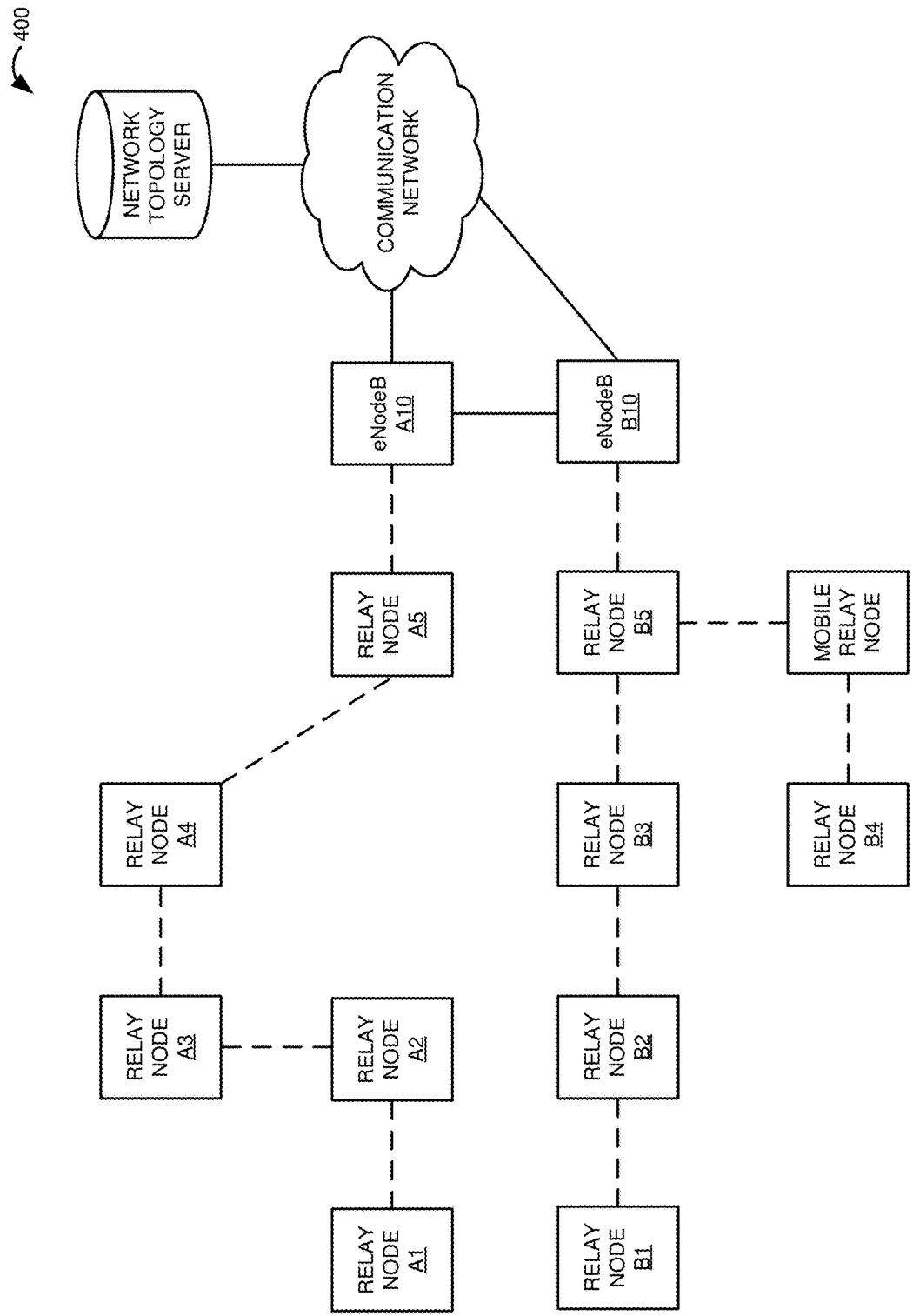
FIG. 4 is a block diagram that illustrates an LTE communication system in an exemplary embodiment.

FIG. 4 is a block diagram that illustrates LTE communication system 400 in an exemplary embodiment. Communication system 400 shows the effect of the mobile relay node moving away from eNodeB A10 as shown in FIG. 3 and reattaching to relay node B5. Upon relocating, the mobile relay node may report various information to the network topology server, such as new and/or former attachment information, an identifier of the mobile relay node, new and/or former latitude and longitude location data, a velocity vector, power status, signal strength, protocols, and any other desired information.

Upon receipt of the updated attachment information from the mobile relay node, the network topology server recognizes that the network topology has changed, and responsively broadcasts a network topology registration service that all connected repeaters can discover to register any changes to their configuration, including but not limited to repeater name/identifier, repeater type (e.g. static or nomadic), location details (e.g. present and/or previous latitude and longitude), serving and donor node attachments, serving and donor sites, and other information. As part of the protocol to exchange repeater configuration information, the network topology server may not only authenticate the repeater's network topology agent, but also ensure that the repeater is reporting a donor site that is actually the one used to get to the network topology server. Similarly, the network topology server may use timing metrics to poll all repeaters (nomadic or otherwise) connected to a donor site to determine their sequencing order. For example, relay nodes A1-A5 reporting to the network topology server as dependent on a donor site served by eNodeB A10 and which show communication delays that differ to each other as A1=T+9 microseconds (µs), A2=T+7 µs, A3=T+5 µs, A4=T+3 µs, and A5=T+1 µs, would be noted in the network topology map as A10>A5>A4>A3>A2>A1 to reflect the timing sequence. In some examples, network topology server may specifically trigger eNodeBs A10 and B10 to re-scan their network trees to discover their attached relay nodes. For example, eNodeB A10 could receive an attachment scan request from the network topology server and responsively query or ping relay nodes A1-A5 for their attached serving and donor nodes.

After relocating as shown in FIG. 3, the mobile relay node is attached to the donor site served by eNodeB B10. The new network topology for the B10 donor site is reported as relay node B1 served by relay node B2 which is served by relay node B3 which is served by relay node B5. Relay node B5 is served directly by eNodeB B10, and serves the mobile relay node which in turn serves relay node B4. Note that the connection between relay node B3 and B4 shown in FIG. 3 is no longer present due to the addition of the mobile relay node, which is now serving relay node B4. In the donor site served by eNodeB A10 where the mobile relay node was formerly attached, relay node A1 is now served by relay node A2 which is served by relay node A4 which is served by relay node A5, and relay node A5 is served directly by eNodeB A10. The network topology server receives the necessary attachment information and updates its network topology map accordingly as described above, thereby providing an accurate snapshot of the current network topology.

Using the above techniques, the network through the network topology server will know that a mobile repeater has changed position and can keep track of its current and new attachments and location. The location of the mobile relay node can then be used whenever the location of an attached UE is requested, particularly when the UE cannot use mobile-based/assisted global positioning system (A-GPS) location techniques. Without knowledge of the position of the mobile relay node, the network may not report any location or may inaccurately report a rough location of the eNodeB donor site, which unfortunately may complicate the provision of emergency services. However, the above techniques beneficially enable calculations of much more accurate locations of the queried UE device when served by a wireless relay node remotely located a far distance away from the eNodeB that is ultimately serving the UE. In this manner, commercial location-based services, emergency services, network services, and other systems requiring the location of the UE are afforded enhanced location accuracy, thereby improving the efficacy of these services.

Figure 5:
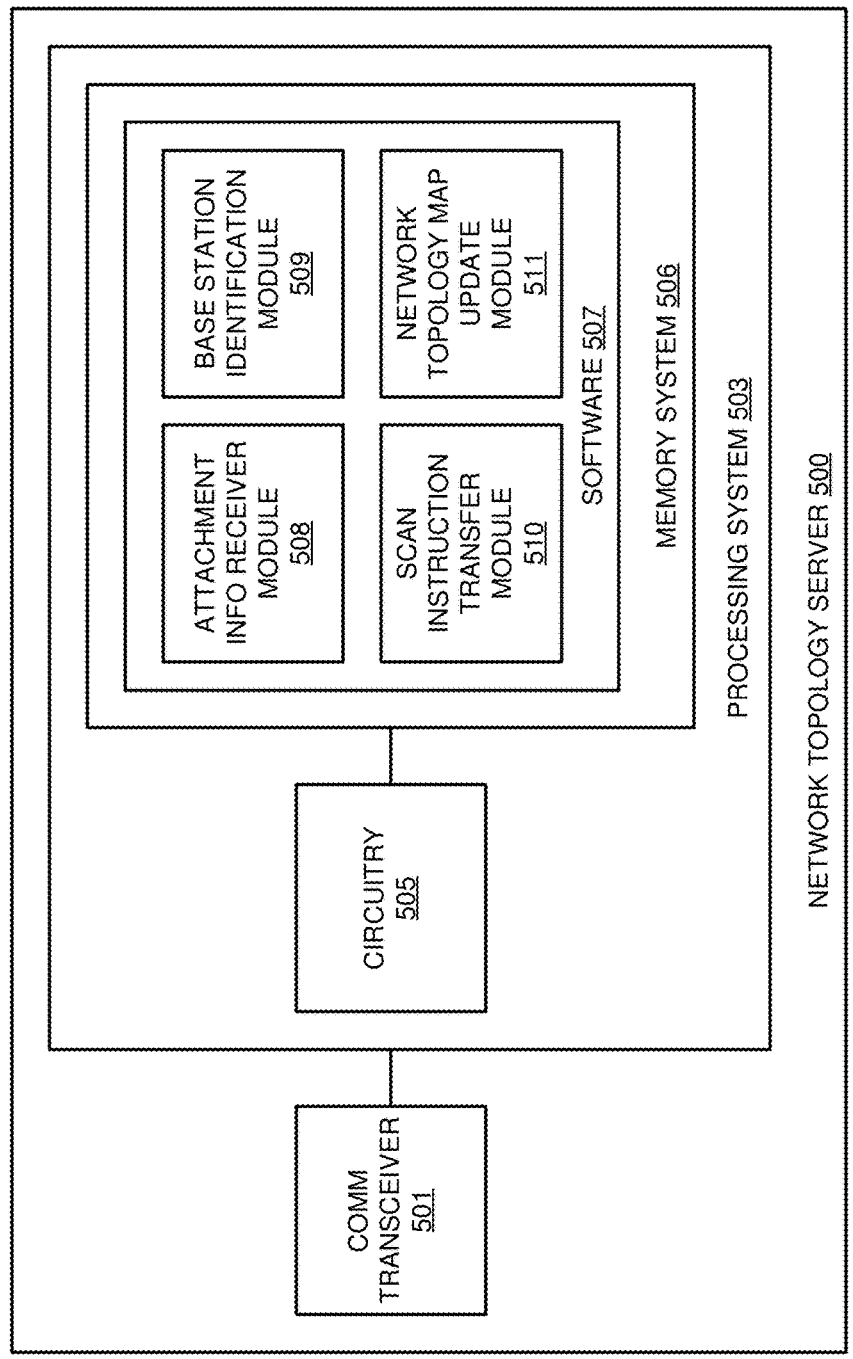
FIG. 5 is a block diagram that illustrates a network topology server.

FIG. 5 is a block diagram that illustrates network topology server 500. Network topology server 500 provides an example of network topology server 140, although server 140 may have alternative configurations. Network topology server 500 comprises communication transceiver 501 and processing system 503. Processing system 503 is linked to communication transceiver 501. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format, including combinations thereof. Communication transceiver 501 could be configured to receive updated attachment information transmitted from a mobile wireless repeater, transfer an attachment scan instruction for delivery to a former macro LTE base station and a new macro LTE base station, and receive former network attachment information and new network attachment information.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory system 506 comprises a non-transitory computer readable storage medium readable by processing circuitry 505 and capable of storing software 507, such as a disk drive, flash drive, data storage circuitry, or some other hardware memory apparatus. Memory system 506 may comprise a single device or could be distributed across multiple devices, including devices in different geographic areas. Memory system 506 may be embedded in various types of equipment. In some examples, a computer apparatus could comprise memory system 506 and operating software 507. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for network topology server 140. In particular, operating software 507 may direct processing system 503 to direct communication transceiver 501 to receive updated attachment information transmitted from a mobile wireless repeater. Operating software 507 further directs processing system 503 to process the updated attachment information to identify a former macro LTE base station to which the mobile wireless repeater was previously attached and a new macro LTE base station to which the mobile wireless repeater is presently attached. Operating software 507 may also direct processing system 503 to direct communication transceiver 501 to transfer an attachment scan instruction for delivery to the former macro LTE base station and the new macro LTE base station. Operating software 507 further directs processing system 503 to direct communication transceiver 501 to receive the former network attachment information and the new network attachment information. Operating software 507 directs processing system 503 to update a network topology map with the former network attachment information and the new network attachment information.

In this example, operating software 507 comprises an attachment information receiver software module 508 that receives updated attachment information transmitted from the mobile wireless repeater. Operating software 507 also comprises a base station identification software module 509 that processes the updated attachment information to identify a former macro LTE base station to which the mobile wireless repeater was previously attached and a new macro LTE base station to which the mobile wireless repeater is presently attached. Operating software 507 further comprises a scan instruction transfer software module 510 that transfers an attachment scan instruction for delivery to the former macro LTE base station and the new macro LTE base station. Finally, operating software 507 comprises a network topology map update software module 511 that receives the former network attachment information and the new network attachment information and updates a network topology map with the former network attachment information and the new network attachment information.

Figure 6:
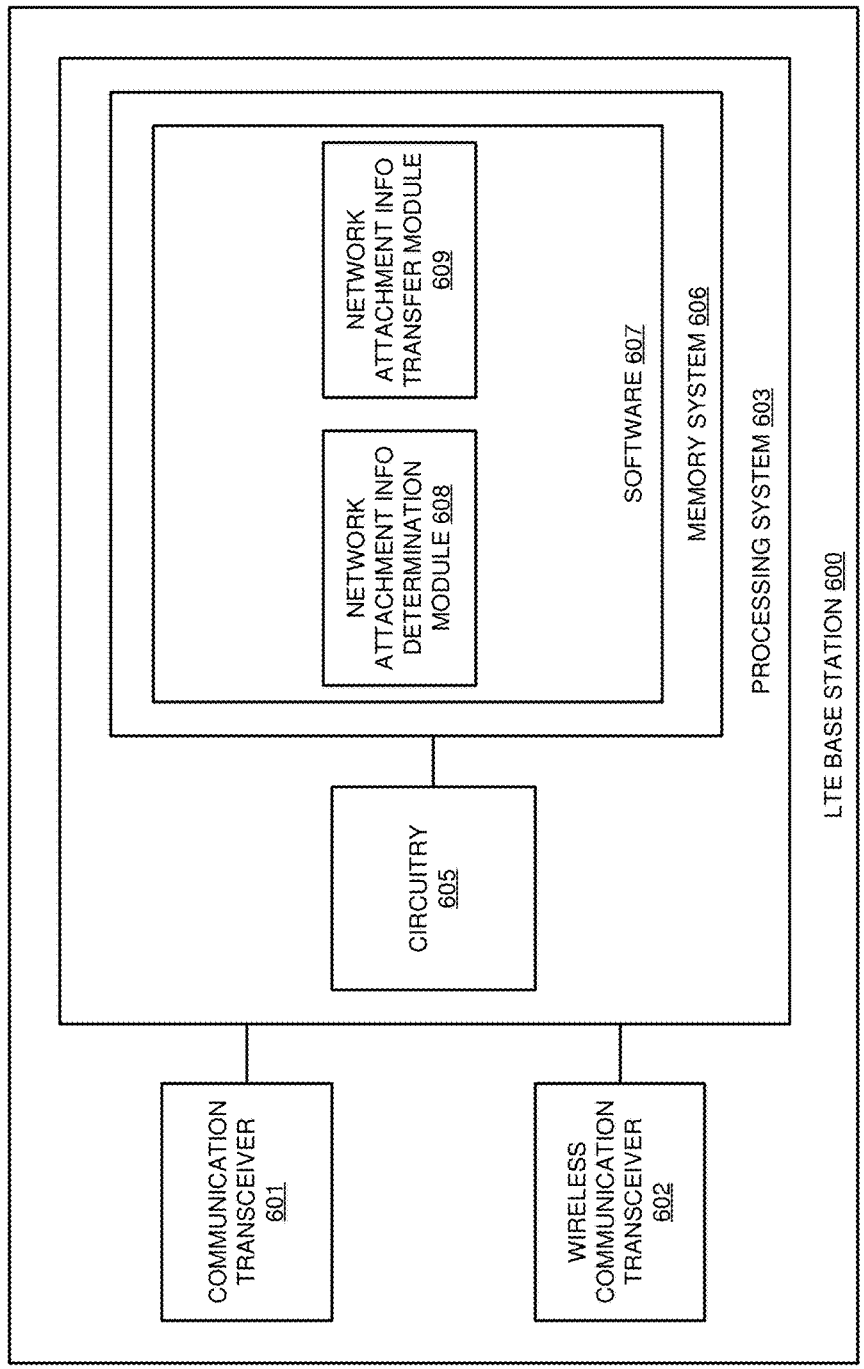
FIG. 6 is a block diagram that illustrates an LTE base station.

FIG. 6 is a block diagram that illustrates LTE base station 600. LTE base station 600 provides an example of base stations 110 and 120, although base stations 110 and 120 may have alternative configurations. LTE base station 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format, including combinations thereof. Communication transceiver 601 could be configured to receive an attachment scan instruction transmitted from a network topology server and transfer network attachment information for delivery to the network topology server.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format, including combinations thereof. In some examples, wireless communication transceiver 602 could be configured to receive an attachment scan instruction transmitted from a network topology server and transfer network attachment information for delivery to the network topology server.

Processing circuitry 605 comprises microprocessor and other circuitry that retrieves and executes operating software 607 from memory system 606. Processing circuitry 605 may comprise a single device or could be distributed across multiple devices, including devices in different geographic areas. Processing circuitry 605 may be embedded in various types of equipment. Examples of processing circuitry 605 include central processing units, application specific processors, logic devices, and/or any type of computer processing devices, including combinations thereof. Memory system 606 comprises a non-transitory computer readable storage medium readable by processing circuitry 605 and capable of storing software 607, such as a disk drive, flash drive, data storage circuitry, or some other hardware memory apparatus. Memory system 606 may comprise a single device or could be distributed across multiple devices, including devices in different geographic areas. Memory system 606 may be embedded in various types of equipment. In some examples, a computer apparatus could comprise memory system 606 and operating software 607. Operating software 607 may be implemented in program instructions and may be executed by processing system 603. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for base stations 110 and 120. In particular, operating software 607 may direct processing system 603 to direct communication transceiver 601 to receive an attachment scan instruction. Operating software 607 may further direct processing system 603 to, in response to the attachment scan instruction, determine network attachment information for one or more wireless repeaters attached to LTE base station 600. Operating software 607 may also direct processing system 603 to direct communication transceiver 601 to transfer the network attachment information for delivery to a network topology server.

In this example, operating software 607 comprises a network attachment information determination software module 608 that, in response to an attachment scan instruction, determines network attachment information for one or more wireless repeaters attached to LTE base station 600. Operating software 607 also comprises a network attachment information transfer software module 609 that transfers the network attachment information for delivery to a network topology server.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long-Term Evolution (LTE) communication system to facilitate updating network topology information when a mobile wireless repeater changes its attachment, the method comprising:
   in a network topology server, receiving updated attachment information transmitted from the mobile wireless repeater;
   in the network topology server, processing the updated attachment information to identify a former macro LTE base station to which the mobile wireless repeater was previously attached and a new macro LTE base station to which the mobile wireless repeater is presently attached;
   in the network topology server, transferring an attachment scan instruction for delivery to the former macro LTE base station and the new macro LTE base station;
   in the former macro LTE base station, in response to the attachment scan instruction, determining former network attachment information for one or more former network wireless repeaters attached to the former macro LTE base station and transferring the former network attachment information for delivery to the network topology server;
   in the new macro LTE base station, in response to the attachment scan instruction, determining new network attachment information for one or more new network wireless repeaters attached to the new macro LTE base station and transferring the new network attachment information for delivery to the network topology server; and
   in the network topology server, receiving the former network attachment information and the new network attachment information and updating a network topology map with the former network attachment information and the new network attachment information.

2. The method of claim 1 further comprising the topology server receiving a request for a proximate location of a User Equipment (UE) device served by the mobile wireless repeater and returning a location of the mobile wireless repeater in response to the request.

3. The method of claim 1 further comprising receiving a location of the mobile wireless repeater along with the updated attachment information transmitted from the mobile wireless repeater.

4. The method of claim 1 further comprising receiving a velocity vector of the mobile wireless repeater along with the updated attachment information transmitted from the mobile wireless repeater.

5. The method of claim 1 wherein receiving the updated attachment information transmitted from the mobile wireless repeater comprises receiving former repeater attachment information and new repeater attachment information.

6. The method of claim 5 wherein the wherein the former repeater attachment information comprises a former donor node and one or more former serving nodes, and the new repeater attachment information comprises a new donor node and one or more new serving nodes.

7. The method of claim 1 wherein determining the former network attachment information for the one or more former network wireless repeaters attached to the former macro LTE base station comprises querying each of the former network wireless repeaters attached to the former macro LTE base station for their attachment information.

8. The method of claim 1 wherein determining the former network attachment information for the one or more former network wireless repeaters attached to the former macro LTE base station comprises pinging each of the former network wireless repeaters attached to the former macro LTE base station to determine delay time information, and processing the delay time information to determine a sequencing order of the one or more former network wireless repeaters.

9. The method of claim 1 wherein determining the new network attachment information for the one or more new network wireless repeaters attached to the new macro LTE base station comprises querying each of the new network wireless repeaters attached to the new macro LTE base station for their attachment information.

10. The method of claim 1 wherein determining the new network attachment information for the one or more new network wireless repeaters attached to the new macro LTE base station comprises pinging each of the new network wireless repeaters attached to the new macro LTE base station to determine delay time information, and processing the delay time information to determine a sequencing order of the one or more new network wireless repeaters.

11. A Long-Term Evolution (LTE) communication system to facilitate updating network topology information when a mobile wireless repeater changes its attachment, the LTE communication system comprising:
 a network topology server configured to receive updated attachment information transmitted from the mobile wireless repeater, process the updated attachment information to identify a former macro LTE base station to which the mobile wireless repeater was previously attached and a new macro LTE base station to which the mobile wireless repeater is presently attached, and transfer an attachment scan instruction for delivery to the former macro LTE base station and the new macro LTE base station;
 the former macro LTE base station configured to, in response to the attachment scan instruction, determine former network attachment information for one or more former network wireless repeaters attached to the former macro LTE base station and transfer the former network attachment information for delivery to the network topology server;
 the new macro LTE base station configured to, in response to the attachment scan instruction, determine new network attachment information for one or more new network wireless repeaters attached to the new macro LTE base station and transfer the new network attachment information for delivery to the network topology server; and
 the network topology server further configured to receive the former network attachment information and the new network attachment information and update a network topology map with the former network attachment information and the new network attachment information.

12. The LTE communication system of claim 11 further comprising the network topology server configured to receive a request for a proximate location of a User Equipment (UE) device served by the mobile wireless repeater and return a location of the mobile wireless repeater in response to the request.

13. The LTE communication system of claim 11 further comprising the network topology server configured to receive a location of the mobile wireless repeater along with the updated attachment information transmitted from the mobile wireless repeater.

14. The LTE communication system of claim 11 further comprising the network topology server configured to receive a velocity vector of the mobile wireless repeater along with the updated attachment information transmitted from the mobile wireless repeater.

15. The LTE communication system of claim 11 wherein the network topology server configured to receive the updated attachment information transmitted from the mobile wireless repeater comprises the network topology server configured to receive former repeater attachment information and new repeater attachment information.

16. The LTE communication system of claim 15 wherein the wherein the former repeater attachment information comprises a former donor node and one or more former serving nodes, and the new repeater attachment information comprises a new donor node and one or more new serving nodes.

17. The LTE communication system of claim 11 wherein the former macro LTE base station configured to determine the former network attachment information for the one or more former network wireless repeaters attached to the former macro LTE base station comprises the former macro LTE base station configured to query each of the former network wireless repeaters attached to the former macro LTE base station for their attachment information.

18. The LTE communication system of claim 11 wherein the former macro LTE base station configured to determine the former network attachment information for the one or more former network wireless repeaters attached to the former macro LTE base station comprises the former macro LTE base station configured to ping each of the former network wireless repeaters attached to the former macro LTE base station to determine delay time information and process the delay time information to determine a sequencing order of the one or more former network wireless repeaters.

19. The LTE communication system of claim 11 wherein the new macro LTE base station configured to determine the new network attachment information for the one or more new network wireless repeaters attached to the new macro LTE base station comprises the new macro LTE base station configured to query each of the new network wireless repeaters attached to the new macro LTE base station for their attachment information.

20. The LTE communication system of claim 11 wherein the new macro LTE base station configured to determine the new network attachment information for the one or more new network wireless repeaters attached to the new macro LTE base station comprises the new macro LTE base station configured to ping each of the new network wireless repeaters attached to the new macro LTE base station to determine delay time information and process the delay time information to determine a sequencing order of the one or more new network wireless repeaters.

* * * * *